United States Patent [19]
Kvernes

[11] Patent Number: 4,752,535
[45] Date of Patent: Jun. 21, 1988

[54] ALUMINIUM-BASED ARTICLE HAVING A PROTECTIVE CERAMIC COATING, AND A METHOD OF PRODUCING IT

[75] Inventor: Ingard Kvernes, Nittedal, Norway

[73] Assignee: Norsk Hydro a.s, Oslo, Norway

[21] Appl. No.: 916,675

[22] PCT Filed: Jan. 29, 1986

[86] PCT No.: PCT/NO86/00007

§ 371 Date: Sep. 10, 1986

§ 102(e) Date: Sep. 10, 1986

[87] PCT Pub. No.: WO86/04615

PCT Pub. Date: Aug. 14, 1986

[30] Foreign Application Priority Data

Feb. 1, 1985 [NO] Norway ................................ 850403

[51] Int. Cl.[4] ......................... B32B 15/16; B05D 1/10

[52] U.S. Cl. .................................... 428/547; 428/552; 428/564; 428/565; 428/632; 428/654; 428/937; 427/34

[58] Field of Search ............... 428/610, 632, 654, 937, 428/552, 553, 557, 565, 547, 568, 564; 427/423, 34

[56] References Cited

U.S. PATENT DOCUMENTS

| | | | |
|---|---|---|---|
| 3,006,782 | 10/1961 | Wheildon | 428/937 |
| 3,091,548 | 5/1963 | Dillon, II | 117/70 |
| 3,898,053 | 8/1975 | Singleton, Jr. | 428/654 |
| 3,920,412 | 11/1975 | Jones | 428/654 |
| 4,180,622 | 12/1979 | Burkhard et al. | 427/423 |
| 4,248,940 | 2/1981 | Goward et al. | 427/423 |
| 4,421,799 | 12/1983 | Novinski | 427/423 |
| 4,489,140 | 12/1984 | Pulliam et al. | 428/654 |
| 4,588,607 | 5/1986 | Matarese et al. | 427/423 |
| 4,588,655 | 5/1986 | Kushner | 427/423 |
| 4,645,716 | 2/1987 | Harrington et al. | 427/423 |

FOREIGN PATENT DOCUMENTS

| | | | |
|---|---|---|---|
| 0139396 | 5/1985 | European Pat. Off. . | |
| 166097 | 1/1986 | European Pat. Off. | 427/423 |
| 3221230 | 12/1983 | Fed. Rep. of Germany | 427/423 |
| 122077 | 7/1983 | Japan | 427/423 |
| 23865 | 2/1984 | Japan | 427/423 |
| 24941 | 2/1985 | Japan | 427/423 |
| 55313 | 3/1986 | Japan | 427/423 |
| WO8201898 | 6/1982 | PCT Int'l Appl. . | |
| 2003935 | 3/1979 | United Kingdom . | |
| 2130250 | 5/1984 | United Kingdom . | |

*Primary Examiner*—John J. Zimmerman
*Attorney, Agent, or Firm*—Wenderoth, Lind & Ponack

[57] ABSTRACT

Described are an aluminium-based article having a heat and corrosion protective coating, especially engine parts such as piston crown or cylinder head, and a method of preparing said article. The coating consists of an aluminium-based bonding layer, preferably having a thickness in the range 0.1–0.6 mm, and an outer top layer of stabilized or partially stabilized zirconium dioxide, preferably having a thickness in the range 0.5–2.5 mm, and optionally a cermet layer, comprising zirconium dioxide and an aluminium-based metal component, between the bonding layer and the outer zirconium dioxide top layer. The bonding layer is applied to the substrate by thermal spraying of a rapidly solidified powder, substantially consisting of 60–80% by weight of Al and 40–20% by weight of Si, the particles of the powder having a frozen unstable micro-structure. The cermet layer desirably is a layer consisting of zirconium dioxide and an aluminium-based alloy, the metal content of the cermet layer decreasing substantially uniformly in the direction towards the outer zirconium dioxide top layer. The cermet layer preferably has a thickness in the range 0.2–0.6 mm. Also the cermet and zirconium oxide layers are deposited by thermal spraying.

6 Claims, 1 Drawing Sheet

Figure 1:
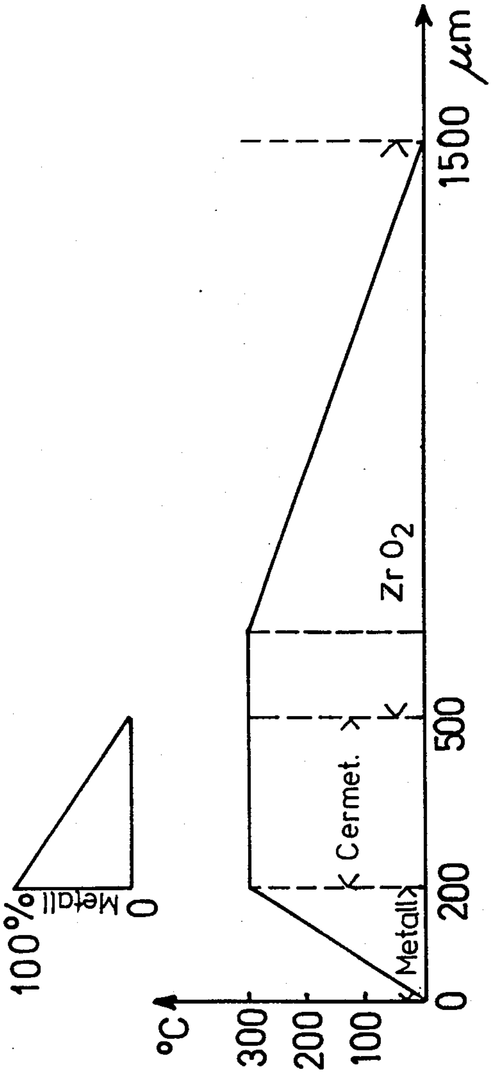

ALUMINIUM-BASED ARTICLE HAVING A PROTECTIVE CERAMIC COATING, AND A METHOD OF PRODUCING IT

This invention relates to an aluminum-based article provided with a heat barrier coating, especially engine parts such as piston crown or cylinder head a method of producing it, and the use of such coatings on aluminum-based surfaces for the protection against the effect of high temperatures, especially heat shock, and against corrosion; and the use of a special bonding layer.

It is known that metal articles can be coated with a heat barrier making the article more resistant to high temperatures. For instance, it is known to coat e.g. an engine piston with ceramic materials. More particularly, it is known to coat aluminum-based (silumin) engine pistons with a heat barrier in the form of a sandwich coating comprising alternate layers of ceramic material, such as $ZrO_2$, and cermet layers in which zirconium dioxide may be included. A known coating of this type comprises a Ni-Al bonding layer on the substrate, followed by a cermet layer (30% NiAl, 70% ceramics), a ceramic layer, and thereafter several cermet layers (70% NiAl, 30% ceramics) alternating with ceramic layers, the outer layer being ceramic.

Such a sandwich coating, having $ZrO_2$ as ceramics, has been tested, by the present inventor among others, using a test generally accepted for such coatings. This "accelerated" test essentially consists in subjecting the coating to treatment cycles comprising heating and guenching, each cycle consisting in that the coating is exposed for fifteen seconds to a flame having a temperature of 1100° C., whereupon the coating is water cooled for fifteen seconds, followed by drying with pressurized air.

It was found that said sandwich coating does not meet the usual requirements of heat resistance for coatings on aluminum alloy. Cracks/flakes arose, first in the cermet material, and then the $ZrO_2$ top layer began to spall.

To my knowledge it has not till now been reported that ceramic coatings have been made to adhere durably on aluminum alloys, tested in the above mentioned generally accepted way.

For iron/steel substrates it is known to use a bonding layer of MCr AlY, wherein M=Ni, Co, Fe or NiCo. For Al-based substrates it is known, as mentioned above, to use a bonding layer of nickel aluminide, i.e. nickel is the main metal.

It was now found that heat barrier coatings including an outer top layer of stabilized or partially stabilized $ZrO_2$ can advantageously be deposited on substrates of aluminum alloy, such as silumin, by means of a special bonding layer of aluminum alloy. Preferably a cermet layer is used between the bonding layer and the outer $ZrO_2$ top layer.

Thus, the invention relates to an aluminium-based article having a heat and corrosion protective, heat shock resistant coating, especially engine parts such a piston head, cylinder head or cover, characterized in that it has a coating consisting of an aluminium-based bonding layer and an outer top layer of stabilized or partially stabilized zirconium dioxide, and optionally a cermet layer, comprising zirconium dioxide and an aluminum-based metal component, between the bonding layer and the outer zirconium dioxide top layer. The bonding layer preferably has a thickness in the range 0.1–0.6 mm, especially about 0.3 mm. The outer top layer of stabilized or partially stabilized zirconium dioxide perferably has a thickness in the range 0.5–2.5 mm, especially 1.0–1.5 mm.

A preferred embodiment of the article according to the invention resides in that the bonding layer is applied by thermal spraying of a rapidly solidified powder. The particle sizes of the powder preferably lie in the range 5 μm–60 μm, especially 10–40 μm.

According to a further, preferred embodiment the bonding layer substantially consists of 60–80% by weight of Al and 40–20% by weight of Si. Thus, said powder preferably has this composition.

Another preferred embodiment resides in that the cermet layer is a layer substantially consisting of zirconium dioxide and an aluminum-based alloy, preferably an alloy of 60–80% by weight of Al and 40–20% by weight of Si, and that the metal ratio of the cermet layer decreases substantially uniformly in the direction towards the outer zirconium dioxide top layer, the zirconium dioxide ratio of the cermet layer increasing from 0 farthest in the 100% zirconium dioxide at the transition into the outer top layer. The cermet layer preferably has a thickness in the range 0.2–0.6 mm.

According to a further, preferred embodiment of the article according the invention the outer top layer of stabilized or partially stabilized $ZrO_2$ has a porosity in the range 5–15% by volume.

The invention also includes a method of preparing an aluminum-based article having a heat and corrosion protective, heat shock resistant coating, especially engine parts such as piston head, cylinder head or cover, and the method is characterized by applying to the surface to be coated an Al-based bonding layer, preferably having a thickness in the range 0.1–0.6 mm, especially about 0.3 mm, and an outer top layer of stabilized or partially stabilized zirconium dioxide, preferably having a thickness in the range 0.5–2.5 mm, especially 1.0–1.5 mm, and optionally a cermet layer, comprising zirconium dioxide and an aluminium-based metal component, between the bonding layer and the outer zirconium dioxide top layer.

According to a preferred embodiment of the method of the invention the bonding layer is applied by thermal spraying of a rapidly solidified powder, preferably a powder having particle sizes in the range 5 μm–60 μm, especially 10–40 μm.

According to a further, preferred embodiment of the method, an alloy substantially consisting of 60–80% by weight of Al and 40–20% by weight of Si is used as aluminum-based alloy for the bonding layer.

According to another preferred embodiment of the method there is applied as cermet layer a layer substantially consisting of zirconium dioxide and an aluminium-based alloy, preferably an alloy of 60–80% by weight of Al and 40–20% by weight of Si, the cermet layer being applied having a substantially uniformly decreasing metallic proportion, considered in the direction towards the outer zirconium dioxide top layer, the zirconium dioxide proportion of the cermet layer increasing correspondingly from zero farthest in to 100% zirconium dioxide at the transition into the outer top layer. The cermet layer is preferably given a thickness in the range 0,2–0,6 mm.

According to a further preferred embodiment of the method according to the invention the cermet layer is applied by thermal spraying, the substrate being maintained at a temperature of about 300° C. during spraying using gas cooling, for instance with a mixture of air and $CO_2$, the substrate being preferably maintained at about 300° C. also during the spraying of the initial 100–200 μm of the $ZrO_2$ layer, whereafter the remainder of the $ZrO_2$ layer is sprayed using controlled cooling, preferably with $CO_2$ gas, such that the surface temperature of the work-piece gradually falls to about 100° C. at the end of the $ZrO_2$ spraying.

The zirconium dioxide layer can be applied by thermal spraying in a conventional manner. While a surface temperature of about 300° C. is preferred for the substrate during spraying of the cermet layer, it has been found advantageous for the purposes of the invention to cool the work-piece (the substrate, for instance a piston crown) somewhat more strongly during the spraying of the zirconium dioxide layer, i.e. such that the surface temperature gradually falls to about 100° C. at the end of the entire spraying operation. Most preferred, however, is the use of the modification of the cooling which resides in that the surface temperature of about 300° C. is maintained also during the spraying of the initial 100–200 μm, preferably about 150 μm, of the zirconium dioxide layer, whereupon a stronger cooling with gas is started. Control of the cooling is readily achieved by a suitable choice of cooling gas and the temperature thereof.

The expressions "stabilized" and "partially stabilized", which are known to those skilled in the art, refer to the fact that the $ZrO_2$ lattice can be stabilized by means of other oxides, especially $Y_2O_3$ and MgO. Powders of so stabilized or partially stabilized $ZrO_2$ are commercially available. For the purposes of the invention there is preferably used a partially stabilized cubic $ZrO_2$ containing up to 20% by weight of $Y_2O_3$, preferably about 8% by weight of $Y_2O_3$, or up to 24% by weight of MgO.

The expression "rapidly solidified metal powder" is well known to metallurgists. Rapid solidification is used to "freeze" a desired, unstable metal structure which would not be obtained if for instance metal droplets are cooled slowly. Rapid solidification is especially applicable when it is desired to obtain an alloy having greater solubility for one or more alloy components, or in order to avoid segregation in the material, that is achieve greater homogeneity. The production of rapidly solidified metal powders is generally known. Such metal powders are usually produced using a cooling rate of the order of magnitude of $10^6$°C./minute. However, a cooling rate as high as $10^6$°C./minute is not always required in making powders suitable for use in this invention as a lower cooling rate may provide a microstructure homogeneity which is sufficient for some applications.

Ceramic coatings on combustion engine parts which are to be exposed to high temperatures must have good thermal shock and adherence properties, and good erosion and corrosion characteristics. The bonding layer which is used according to the invention has been found to be of decisive importance in order to obtain a successful total coating having a long life.

It has been found that the bonding layer should have a thickness in the range of about 0.1–0.6 mm, preferably about 0.3 mm. If the bonding layer is thinner than 0.1 mm it tends to be inadequate in its main function, which is to bond the underlying substrate to the overlying layer, and a bonding layer thicker than 0.6 mm has turned out to entail increased risk of material failure when the material is exposed to great temperature fluctuations. In any case it is unnecessary to make the bonding layer thicker than 0.6 mm, although this is not an upper limit.

It will be understood that the bonding layer has no sharply defined minimum thickness as the latter depends on several factors, i.a. the grain sizes of the powder particles which are applied to the substrate to produce a good bonding to the ceramic material, and the quality (heat shock resistance, durability) required in each case. Thus, in some cases it can be tolerated that the bonding layer is spotwise pierced by for instance $ZrO_2$ particles. However, this is not preferred. Further, it will be understood that the bonding layer can merge gradually into the ceramics-containing layer, in fact this is just what is preferred. It has been found that a uniform, gradual transition from the metal-based bonding layer to the outer $ZrO_2$ top layer provides the most reliable coatings, i.e. the $ZrO_2$ content increases substantially uniformly from the bonding layer towards the $ZrO_2$ top layer.

The alloy which is used for the bonding layer is, as mentioned above, based on aluminium as the main constituent and, preferably, the alloy consists substantially of 60–80% by weight of Al and 40–20% by weight of Si. However, the choice of alloy composition will to some extent depend on the chemical composition of the substrate. An optimalisation in this respect in a safe manner can only be made by thorough testing of the finished coating. Depending on the requirements which are made in each case, metals other than aluminium and silicon may be tolerated in minor amounts, for instance nickel and/or iron in amounts which preferably do not exceed 5% by weight, but which can be substantially higher depending on the chemical composition of the substrate. However, it is important that the bonding layer is compatible with the substrate. The bonding layer should also be as corrosion resistant as possible in the environment of use.

Thus, the abovementioned preferred percentage ranges, 60–80% Al and 40–20% Si, apply when impurities are absent, or left out of account. In addition to iron and/or other metallic components or impurities, the Al-Si alloy used for the bonding layer can contain metal oxides in an amount up to 8% by weight. Unless special measures are taken to avoid oxide formation, such as the use of vacuum or inert gas, the bonding layer will usually contain a few percent of metal oxides formed due to the high temperature environment during thermal spraying of the Al-Si alloy powder.

The use of a bonding layer as herein described has been found to be the key to achieving a heat resistant, durable ceramic coating on an Al-based alloy substrate. Apparently, such bonding layer of rapidly solidified Al-Si based alloy effectively minimises the thermal/mechanical stress and strain caused by great temperature fluctuations or thermal shock. Thus, the use of such bonding layer constitutes an essential part of the present invention.

The cermet layer serves to provide a gradual transition between the metallic bonding layer and the ceramic zirconium dioxide top layer, whereby mechanical stresses during highly varying temperatures (heat shock) are reduced. However, for some application purposes the cermet layer can be omitted, as the quality of the total coating in use may still be found satisfactory. For especially demanding applications, such as in the case of engine parts to be exposed to high temperatures, it will generally be necessary or desirable to use a cermet layer between the bonding layer and the ceramic top layer. However, it will not always be necessary to use a cermet layer of the above described preferred type, i.e. in which the cermet layer content of ceramic component is increased gradually in the direction towards the outer zirconium dioxide top layer. The invention is not limited to the use of this preferred embodiment of the cermet layer, as any other embodiments of the cermet layer, used in conjunction with the described bonding layer, are considered to fall within the scope of the invention. Thus, for many applications it may be satisfactory, for instance, to use a cermet layer in which the content of the ceramic component increases non-uniformly, such as incrementally or stepwise, in the direction towards the zirconium dioxide top layer. However, it should be noted that, preferably, the protective coating provided according to the invention includes a cermet layer between the bonding layer and the zirconium dioxide top layer.

The preferred cermet layer is suitably applied by thermal spraying, and a preferred embodiment of the method according to the invention resides in that the cermet layer is sprayed using two powder feeders, one for the metallic component and the other for the ceramic component, both powder types being introduced simultaneously into the heat zone of the spray gun. Equipment suitable for powder spraying will be described below.

The substrate (for instance an engine piston) to be coated can be cleaned in a conventional manner, and this operation preferably includes grit blasting with aluminium oxide particles, although other particulate materials can be used if desired, preferably then particles having properties similar to those of aluminium oxide particles. A preferred embodiment of the method according to the invention resides in that the substrate surface to be coated is cleaned by grit blasting with coarse grain aluminium oxide, preferably having grain sizes in the range 0.5–1.7 mm. It has been found that one will then achieve a suitably coarse substrate surface structure, and it is believed that stresses arise in the surface which because of a higher energy level in the surface serve to improve the adherence of the bonding layer (possibly a metallurgical bonding is achieved). Said coarse structure is also advantageous in that it permits spraying of relatively thick coatings when this is desired.

The spraying of the final zirconium dioxide top layer has been described above. Therefore, it is here only mentioned that the desired porosity of the ceramic top layer can be controlled in a conventional manner, for instance by adjusting the distance between the spraying equipment and the surface to be coated. As mentioned above, a porosity of 5–15% by volume is aimed at according to the invention. It has been found that a certain porosity in the ceramic top layer is important for top layer toughness.

A high number of tests have been carried out in which coatings comprising bonding layer, cermet layer and $ZrO_2$ top layer were sprayed on engine parts to be exposed to high temperatures. Plasma spray equipment known to Eutronic Plasma (from Castolin+Eutectic, Switzerland) was used. The drawing illustrates the temperature of the surface of the workpiece in typical experiments, as the protective coating was being built up. The start of the spraying is at 0 $\mu m$ coating thickness in the drawing. The thicknesses of the three layers were varied. The drawing shows typical thicknesses.

The substrate was cleaned and roughened by grit blasting with aluminium oxide. ("Metcolite" C), grain sizes 0.5–1.7 mm. The aluminium oxide grit was heated to 60°–80° C. before use so that is was free from moisture.

The bonding layer was sprayed without preheating on the substrate, and the surface temperature of the latter rose to about 300° C. during the spraying. During the spraying of the cermet layer the work-piece was cooled with air or a mixture of air and carbon dioxide and thereby maintained at about 300° C. The drawing illustrates that this temperature was also maintained during the spraying of the initial 150 $\mu m$ of the zirconium dioxide layer, whereafter cooling with $CO_2$ gas was used and controlled such that the surface temperature of the work-piece decreased gradually to 100° C. at the end of the spraying.

As a rule the whole protective coating was sprayed virtually without stop between layers. Especially when the same metallic component is used in the cermet layer as in the bonding layer, this is readily feasible by using two adjustable separate powder feeders, for the metallic component and the ceramic component, respectively.

Table 1 shows spraying parameters as generally used for the bonding layer, using the abovementioned Eutronic Plasma equipment (Model 85). These parameters are designed for spraying a rapidly solidified Al-35 Si powder (i.e. a powder in which the Si content is 35% by weight) onto a substrate of a size similar to that of an automobile engine piston crown. Desirably, slight adjustments should be made to the spraying parameters when powders of different Si contents are to be sprayed. The spraying parameters usually should also be adjusted to the size of the substrate to be coated. It is within the reach of the art-skilled to make such adjustments.

TABLE 1

| Spraying parameters | | |
|---|---|---|
| Nozzle diameter | 6 | mm |
| Primary gas, argon | 3.4 | bar |
| Secondary gas, hydrogen | 4 | bar |
| Powder tube distance | 4–6 | mm |
| Driving gas, argon | 40 | ml/min. |
| Powder | 39 | g/min |
| Ampere | 600 | |
| Volt | 54 | |
| Spraying distance | 115 | mm |
| Rotation velocity (perimeter) | 50 | m/min. |
| Feeding (per revolution) | 5 | mm |
| Number of passes | 6 | |
| Thickness per pass | 0.025 | mm |

Table 2 shows the yield strength, tensile strength and Vickers hardness of test specimens made by extruding well mixed Al and Si powders of various compositions. Specimens 1 to 4 were made from powders of partice sizes in the range of 40–70 $\mu m$ and specimens 5 to 12 were made from powders of particle sizes in the range 10 to 40 $\mu m$. The mechanical properties of such an extruded specimen are indicative of the properties of a coating produced by thermal spraying of the rapidly solidified Al-Si powder made from the extruded specimen. As the data obtained for specimens 1 to 11 indicated that a rapidly solidified Al-Si powder containing a little less than 40% Si might give the best results, test 12 was run using an Al-35Si alloy. The right hand side column of Table 2 shows the results obtained when the complete, $ZrO_2$-finished coating was tested using the initially described accelerated test comprising heating- /quenching cycles, the standard requirement in this test being 2000 cycles before failure.

As can be seen from Table 2, the heat and thermoshock resistance properties of the coating according to the invention were found to meet the requirements when the Si content of the rapidly solidified Al-Si powder used was above 20% by weight. A Si content of 40% is not considered to be an upper limit, cf. test No. 4. However, so far a supply of rapidly, solidified metal powders containing more than 40% Si has not been available for testing.

In the heating/quenching test, the judgement of the coating was made by microscopic examination. An amount of spalling exceeding 5% of the surface area of the coating was taken as a limit, i.e. >5% meaning failure.

TABLE 2

| Test No. | Alloy wt % | $R_{p0.2}$ N/mm² | $R_m$ N/mm² | Hardness HV5/30 | Thermo-shock test, number of cycles. |
|---|---|---|---|---|---|
| 1 | Al 10 Si | 143 | 244 | 70.4 | about 200 |
| 2 | Al 20 Si | 186 | 295 | 95.7 | about 2000 |
| 3 | Al 30 Si | 215 | — | 123.2 | >2000 |
| 4 | Al 40 Si | — | — | 153.2 | >2000 |
| 5 | Al 15 Si | 173 | 297 | 92.4 | <2000 |
| 6 | Al 20 Si | 190 | 306 | 94.9 | about 2000 |
| 7 | Al 25 Si | 230 | 341 | 114.5 | >2000 |
| 8 | Al 30 Si | 229 | 358 | 125.3 | >2000 |
| 9 | Al 25 Si | 252 | 372 | 121.3 | >2000 |
| 10 | Al 25 Si | 250 | 382 | 121.4 | >2000 |
| 11 | Al 25 Si | 277 | 404 | 133.7 | >2000 |
| 12 | Al 35 Si | 235 | 362 | 128.2 | >2000 |

The substrates coated were Al alloys of the type commonly used for automobile engine pistons, such as silumin. Several coatings have been produced and tested using each of the Al-Si powders listed in Table 2, and the results were reasonably well reproducible.

The use of a top layer of stabilized or partially stabilized $ZrO_2$ and the production of such top layer by thermal spraying are well known per se. It is also known that zirconium silicate can be used in place of zirconium oxide, and such modification should be understood to be within the scope of the present invention. Zirconium oxide is, however, superior to the silicate for the purposes of this invention, mainly due to the higher thermal conductivity of the latter.

Table 3 shows spraying parameters generally used for the $ZrO_2$ top layer. The intermediate cermet layer was sprayed using similar parameters, gradually changing (some of the) parameters from that of Table 1 to that of Table 3, note for instance 4 bar versus 7.4 bar for the secondary gas.

TABLE 3

| Spraying parameters | | |
|---|---|---|
| Nozzle diameter | 7 | mm |
| Primary gas, argon | 3.4 | bar |
| Secondary gas, hydrogen | 7.4 | bar |
| Powder tube distance | 4 | mm |
| Driving gas, argon | 2.3 | bar |
| Powder | 40 | g/min. |
| Ampere | 700 | |
| Volt | 58 | |
| Spraying distance | 100 | mm |
| Rotation velocity (perimeter) | 50 | m/min. |
| Feeding (per revolution) | 6 | mm |
| Number of passes | 30 | |

Similar tests have been carried out to see the effect of omitting the intermediate cermet layer, and it turned out that useful coatings could be produced, enduring more than 2000 cycles in the heating/quenching test. However, comparison tests showed superior results when the preferred intermediate cermet layer was included in the coating.

Preferred embodiments of the protective coatings according to the invention have also been tested in actual practice by being used on engine pistons and cylinder heads and have proved to endure the stresses very well. The testing has included both small and large articles (engine parts for marine diesel engines as well as for automobile engines, especially pistons and cylinder heads), and the results have been highly satisfactory. For instance, pistons coated with the herein described preferred protective coatings have been used in the automobile engines, and the automobiles have now been running more than 15000 km (for the Al-35Si bonding layer) with said coatings without damages to the coatings having been observed.

I claim:

1. An aluminum-based article having a heat and corrosion protective coating on at least a portion thereof, said coating comprising a bonding layer applied to said article by plasma spraying of a rapidly solidified Al-Si-based powder comprising from about 60% to about 80% by weight of Al and from about 40% to about 20% by weight of Si, and an outer top layer of stabilized or partially stabilized zirconium dioxide.

2. The article according to claim 1, wherein a cermet layer comprising zirconium dioxide and an aluminum-based metal component is provided between the bonding layer and the outer zirconium dioxide top layer.

3. The article according to claim 2, wherein the cermet layer is a layer consisting essentially of zirconium dioxide and an aluminum-based alloy, and wherein the metal ratio of the cermet layer decreases substantially uniformly in the direction towards the outer zirconium dioxide top layer, and zirconium dioxide ratio of the cermet layer increasing from 0 to 100% zirconium dioxide at the transition into the outer top layer.

4. A method of providing an aluminum-based article, with a heat and corrosion protective coating, comprising steps of applying to at least a portion of the surface of said article, a bonding layer by plasma spraying of a rapidly solidified Al-Si-based powder comprising from about 60% to about 80% by weight of Al and from about 40% to about 20% by weight of Si, and providing an outer top layer of stabilized or partially stabilized zirconium dioxide on top of at least a portion of said bonding layer.

5. A method of providing a piston crown or cylinder head, with a heat and corrosion protective coating, comprising steps of applying to at least a portion of the surface of said piston crown or cylinder head, a bonding layer produced by plasma spraying a rapidly solidified Al-Si-based powder comprising from about 60% to about 80% by weight of Al and from about 40% to about 20% by weight of Si, applying to at least a portion of said bonding layer a cermet layer comprising zirconium dioxide and an aluminum-based metal component, and providing an outer top layer of stabilized or partially stabilized zirconium dioxide on top of at least a portion of said cermet layer.

6. The method according to claim 5, wherein said cermet layer is a layer consisting essentially of zirconium dioxide and an aluminum-based alloy, said cermet layer having a substantially uniformly decreasing metallic proportion in the direction towards the outer zirconium dioxide top layer, the zirconium dioxide proportion of the cermet layer increasing from zero at the innermost portion to 100% zirconium dioxide at the transition into the outer top layer.

* * * * *